(12) United States Patent
Chan et al.

(10) Patent No.: US 6,911,417 B2
(45) Date of Patent: Jun. 28, 2005

(54) WATER BLOCK REMOVAL WITH SURFACTANT BASED HYDROCARBONACEOUS LIQUID SYSTEM

(75) Inventors: Albert F. Chan, Plano, TX (US); Michael D. Erwin, Anchorage, AK (US)

(73) Assignee: ConocoPhillips Company, Houston, TX (US)

( * ) Notice: Subject to any disclaimer, the term of this patent is extended or adjusted under 35 U.S.C. 154(b) by 98 days.

(21) Appl. No.: 10/425,013

(22) Filed: Apr. 29, 2003

(65) Prior Publication Data

US 2004/0229758 A1 Nov. 18, 2004

(51) Int. Cl.[7] .............................. C09K 3/00; E21B 21/00
(52) U.S. Cl. ..................... 507/211; 507/261; 507/266; 507/927; 510/421; 510/422; 166/311; 166/312
(58) Field of Search ............................... 507/211, 261, 507/266, 927; 510/421, 422; 166/311, 312

(56) References Cited

U.S. PATENT DOCUMENTS

| | | |
|---|---|---|
| 4,985,154 A | 1/1991 | Balzer et al. |
| 5,725,470 A | 3/1998 | Lazarowitz et al. |
| 5,770,549 A * | 6/1998 | Gross .......................... 510/238 |
| 5,830,831 A | 11/1998 | Chan et al. |
| 5,858,954 A * | 1/1999 | Balzer ......................... 510/417 |
| 5,874,386 A | 2/1999 | Chan et al. |
| 5,977,032 | 11/1999 | Chan |
| 5,996,692 * | 12/1999 | Chan et al. .................. 166/263 |
| 6,000,412 | 12/1999 | Chan et al. |
| 6,090,754 | 7/2000 | Chan et al. |
| 6,110,885 * | 8/2000 | Chan .......................... 510/473 |
| 6,112,814 | 9/2000 | Chan et al. |
| 6,234,183 * | 5/2001 | Chan et al. ................. 134/22.1 |
| 6,566,310 * | 5/2003 | Chan .......................... 507/211 |
| 2002/0107165 * | 8/2002 | Weuthen et al. ............ 510/421 |
| 2003/0100452 * | 5/2003 | Mueller et al. ............. 507/203 |

* cited by examiner

Primary Examiner—Philip C. Tucker
(74) Attorney, Agent, or Firm—F. Lindsey Scott

(57) ABSTRACT

A composition, formulation, and method for removing water from a near-wellbore portion of a subterranean formation containing a crude oil and penetrated by a wellbore. The formulation contains alkylpolyglycoside, ethoxylated alcohol and linear alkyl alcohols. The composition contains a hydrocarbonaceous liquid, alkylpolyglycoside, ethoxylated alcohol and linear alkyl alcohol.

16 Claims, 2 Drawing Sheets

2(a)

2(b)

2(c)

2(d)

US 6,911,417 B2

WATER BLOCK REMOVAL WITH SURFACTANT BASED HYDROCARBONACEOUS LIQUID SYSTEM

FIELD OF THE INVENTION

This invention relates to a composition and method for removing water from the near-wellbore portion of a subterranean formation containing a crude oil and penetrated by a wellbore.

BACKGROUND OF THE INVENTION

In many instances, when wellbores are drilled to penetrate a subterranean oil-bearing formation, it is found that upon completion of the wellbores, whether using an oil-based drilling mud, water-based drilling mud or water-based drill-in-fluids, the near-wellbore portion of the formation frequently retains quantities of water greater than the in-situ or natural water saturation levels of the formation. The in-situ water saturation levels are typically nearly, if not the same, as the connate water saturation levels although in some formations the in-situ water saturation levels may be substantially greater or less than the connate water saturation level for the formation.

As used herein, the term "connate water saturation" or "irreducible water saturation" refers to the minimum water saturation in a subterranean oil-bearing formation that can be achieved by flushing with oil, thereby increasing the oil saturation and the flowing fraction of the oil phase. This can be ascertained or determined in a formation core that has been cleaned, dried and fully water saturated and thereafter flooded with oil. The water remaining after the oil flush is nearly equal or equal to the connate water saturation level and cannot be reduced further by oil flushing or oil contact. The term "in-situ water saturation" refers to the pre-existing formation water saturation level prior to drilling or oil production.

Formations drilled for the production of crude oil are naturally-occurring formations, which as well known to the art, underlie overburden formations and may be above other oil-bearing or non-oil-bearing formations beneath the formation of interest. When such formations are drilled, it is known that they typically have at least an in-situ saturation, which is most commonly the connate (residual saturation) water content. This water content is the inherent water saturation level in the formation and may be increased by the invasion of water-based drilling fluid filtrate components. Typically, the presence of water in excess of the in-situ water saturation level in the formation inhibits the production of crude oil from the formation.

In some formations, it has been noted that the formation has an in-situ water saturation level lower than the connate water saturation level, i.e., the formation actually imbibes water during drilling so that the formation as drilled may retain water up to or beyond the connate water saturation level. In such formations, the imbibed water up to the connate water saturation level is not typically removed by the production of crude oil. The water is only reduced back to the connate water saturation level for the formation through natural mechanisms. The presence of water above the in-situ water saturation level can and does typically inhibit the production of crude oil from the formation.

Previously, attempts to reduce water in the near-wellbore portion of the formation either back to the connate level or below have involved the use of materials such as a mixture of methanol and water or the like, in attempts to remove the water with aqueous solutions that are at least partially soluble in the crude oil. The use of such approaches, while they may have been limitedly successful in some instances, are generally less than completely successful and are less desirable because of the safety concerns on the use of highly flammable methanol solvent.

Various applications wherein alkylpolyglycosides in combination with ethoxylated alcohols, alcohols and the like have been used in aqueous formations are shown in U.S. Pat. No. 4,985,154 issued Jan. 15, 1991 to Balzer, et al; U.S. Pat. No. 5,725,470 issued Mar. 10, 1998 to Lazarowitz, et al; U.S. Pat. No. 5,830,831 issued Nov. 3, 1998 to Chan, et al; U.S. Pat. No. 5,874,386 issued Feb. 23, 1999 to Chan, et al; U.S. Pat. No. 5,977,032 issued Nov. 2, 1999 to Chan; U.S. Pat. No. 6,000,412 issued Dec. 14, 1999 to Chan, et al; U.S. Pat. No. 6,090,754 issued Jul. 18, 2000 to Chan, et al; and U.S. Pat. No. 6,112,814 issued Sep. 5, 2000 to Chan, et al. These patents are hereby incorporated in their entirety by reference.

In other instances, it has been found that water occasionally tends to accumulate to levels above the connate water saturation level in the near-wellbore area during production of oil from the well. As the water accumulates, it successively reduces the flowing fraction of the oil phase, and therefore the production of oil from the formation. This water becomes trapped in the pore structure of the formation and remains in place and does not move with the flow of crude oil from the formation.

Accordingly, a continuing effort has been directed to the development of improved compositions and methods for the removal of bound water from the near-wellbore portion of the formation.

In the discussion of the present invention, reference is made to bound water to refer to imbibed water, water above the connate saturation level, water accumulated and retained in the near-wellbore region around the well, and the like.

SUMMARY OF THE INVENTION

The present invention relates to a method for removing bound water from a near-wellbore portion of a subterranean formation containing crude oil and penetrated by a wellbore, the method comprising: injecting into the near-wellbore portion a quantity of a mixture containing a hydrocarbonaceous liquid, the hydrocarbonaceous liquid being miscible with the crude oil in the formation; about 0.5 to about 2 volume percent of an ethoxylated alcohol, the alcohol containing from about 8 to about 12 carbon chain length alkyl groups with an average of about 2 to about 4 ethylene oxide groups per molecule of alcohol; about 0.2 to about 2 volume percent of at least one alkylpolyglycoside containing alkyl groups containing from about 8 to about 16 carbon atoms and having an average oligomerization number from about 1.2 to about 1.8; and, about 1.5 to about 4 volume percent of a linear alkyl alcohol containing from about 4 to about 6 carbon atoms, the quantity being sufficient to fill the near-wellbore portion of the formation to a radial distance outwardly from the wellbore equal to from about 6 inches to about 3 feet; maintaining the mixture in the near-wellbore portion for a time from about 8 to about 96 hours; and, removing the mixture from the near-wellbore portion.

The invention further comprises a formulation for addition to a hydrocarbonaceous liquid to produce a mixture for removing bound water from a near-wellbore portion of a subterranean formation containing a crude oil and penetrated by a wellbore, the formulation comprising about 18 to about 34 volume percent of an ethoxylated alcohol, the alcohol containing from about 8 to about 12 carbon chain length alkyls with an average of about 2 to about 4 ethylene oxide groups per molecule of alcohol; about 8 to about 28 volume percent of at least one alkylpolyglycoside containing alkyl groups containing from about 8 to about 16 carbon atoms; and, having an average oligomerization number from about 1.2 to about 1.8, and from about 50 to about 70 volume percent of a linear alkyl alcohol containing from about 4 to about 6 carbon atoms.

The invention further relates to a composition for removing bound water from a near-wellbore portion of a subterranean formation containing a crude oil and penetrated by a wellbore, the composition comprising: a hydrocarbonaceous liquid, the hydrocarbonaceous liquid being miscible with the crude oil in the formation; about 0.5 to about 2 volume percent of an ethoxylated alcohol, the alcohol containing from about 8 to about 12 carbon chain length alkyl groups with an average of about 2 to about 4 ethylene oxide groups per molecule of alcohol; about 0.2 to about 2 volume percent of at least one alkylpolyglycoside containing alkyl groups containing from about 8 to about 16 carbon atoms; and, having an average oligomerization number from about 1.2 to about 1.8; and, about 1.5 to about 4 volume percent of a linear alkyl alcohol containing from about 4 to about 6 carbon atoms.

DESCRIPTION OF THE PREFERRED EMBODIMENTS

In the description of the Figures, the same numbers will be used throughout to refer to the same or similar components.

According to the present invention, a composition and method are provided for removing bound water and acquired water from a near-wellbore area in a naturally occurring subterranean oil-bearing formation.

Previously, attempts to remove such water have involved the use of aqueous solutions of methanol in attempts to remove the water within the limits of mutual miscibility between in-situ water, the aqueous methanol, and the crude oil. Such injected fluid may become an aqueous trapped phase, which subsequently blocks the flow of the oil phase. Such attempts, as noted previously, have not been particularly successful, and create safety concerns because of the highly flammable methanol solvent.

According to the present invention, a hydrocarbonaceous liquid is used as a carrier for a formulation that is used to create a microemulsion upon contact with water in the near-wellbore portion of the subterranean formation and thereby easily removes water from the near-wellbore area of the subterranean formation via a low interfacial tension (IFT) displacement mechanism.

This composition comprises an alkylpolygylcoside, an ethoxylated alcohol, and a linear alcohol in combination with the hydrocarbonaceous fluid.

Figure 1:
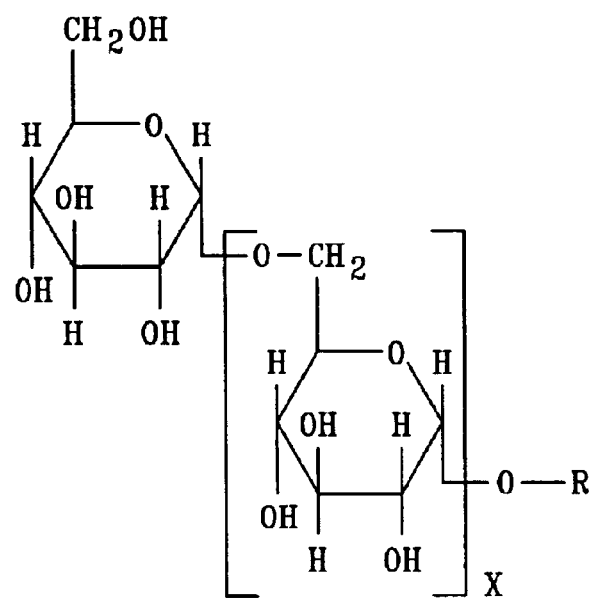
FIG. 1 is a diagram of the molecular structure of an alkylpolygylcoside molecule.

Alkylpolygylcoside surfactants consist of a polar glucose head and a hydrocarbon chain off the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chains R. R can be a linear or branched alkyl chain containing about 8 to about 16 carbon atoms. The polymerization reaction can provide oligomer distributions from x=0 to x=11.

Alkylpolyglycosides have previously been used in the cleaning of wellbores for cementing, for improved production and the like. Typically, such solutions were aqueous and while effective, are not preferred for the present application.

Figure 2:
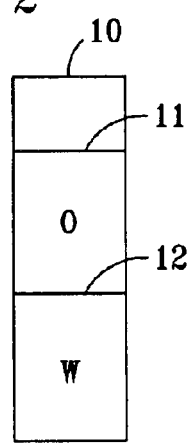
FIG. 2 shows four oil/water systems, including Winsor Type I, Type II, and Type III microemulsions; and, FIG. 3 is a schematic cross-sectional view of a wellbore extending from a surface to penetrate a subterranean oil-bearing formation for the production of crude oil therefrom.
Figure 2:
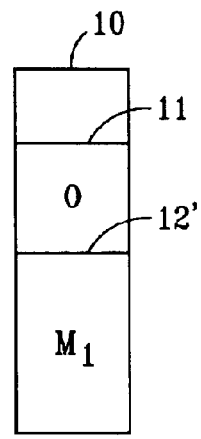
Figure 2:
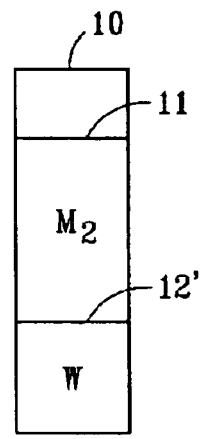
Figure 2:
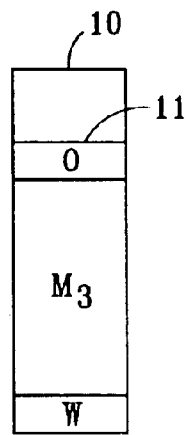

In FIG. 2, Winsor Type I, Type II and Type III microemulsions are shown. FIG. 2($a$) shows oil (O) and water (W) containing surfactants in a container 10 to a level 11 having an interface 12. In FIG. 2($b$) a Type I microemulsion, $M_1$, which is an oil-in-water microemulsion, is shown below an excess oil layer. Such microemulsions are water-soluble and contain quantities of solubilized oil as shown by the level of the new interface 12', which is above the original interface 12. The solubilized volume of oil in the microemulsion phase has been shown to be inversely proportional to the interfacial tension between the microemulsion phase and the excess oil phase, i.e., the larger the solubilized volume, the lower the interfacial tension. In FIG. 2($c$), a Type II microemulsion, $M_2$, which is a water-in-oil microemulsion, is shown above an excess water layer. Such Winsor Type II microemulsions are oil soluble and contain quantities of solubilized water as shown by the level of new interface 12', which is below the original interface 12. FIG. 2($d$) shows a Winsor Type III microemulsion $M_3$, which is located between the excess oil and excess water phases and extends above and below original interface 12. Such Winsor Type III microemulsions are preferred for wellbore operations since their interfacial tensions and solubilization properties toward both oil and/or water can greatly facilitate the removal of both from the wellbore during cleaning operations.

The present invention comprises the use of a hydrocarbonaceous liquid, which can be substantially any hydrocarbonaceous liquid, which is miscible with the crude oil in the subterranean formation of interest, such as xylene, diesel oil, aliphatic or aromatic solvents refinery streams suitable as a miscible solvent, and the like. A wide variety of suitable hydrocarbonaceous materials are well known. Crude oil, while useable, is not preferred since it may contain materials that are reactive with other components of the mixture used to remove the bound water from the near-wellbore portion of the subterranean formation.

The alkylpolyglycosides suitable for use in the present invention are alkylpolyglycosides which contain alkyl groups containing from about 8 to about 16 carbon atoms and have an average oligomerization number from about 1.2 to about 1.8. Desirably the alkylpolyglycosides are present in the mixture of the hydrocarbonaceous liquid, the ethoxylated alcohol, alkylpolygylcoside and linear alcohol in an amount from about 0.2 to about 2 volume percent of the mixture.

Suitable ethoxylated alcohols contain from about 8 to about 12 carbon chain length alkyl groups with an average of about 2 to about 4 ethylene oxide groups per molecule of alcohol. Desirably, the ethoxylated alcohol is present in an amount equal to from about 0.5 to about 2 volume percent of the mixture.

Desirably, the linear alcohol contains from about 4 to about 6 carbon atoms and is present in the mixture in a quantity from about 1.5 to about 4 volume percent.

Preferably, the alkylpolyglycoside is present in amount from about 0.2 to about 1 volume percent of the mixture and preferably the ethoxylated alcohol is present in an amount from about 0.6 to about 1.2 volume percent of the mixture, with the linear alcohol preferably being present in an amount from about 1.5 to about 3 volume percent of the mixture.

The composition is used by injecting the composition into the near-wellbore portion of the subterranean formation at matrix rates (non-fracturing rates) out to a radial distance from about 6 inches up to about 3 feet from the wellbore to substantially fill the near-wellbore portion of the subterranean formation. Preferably, the radial distance is from about 1 to about 3 feet. This places the mixture, which typically comprises about 96 volume percent of the hydrocarbonaceous liquid, in contact with the near-wellbore portion of the subterranean formation. The combination of the alkylpolyglycosides, ethoxylated alcohol and linear alcohol with the hydrocarbonaceous liquid creates a mixture capable of forming a Winsor Type II or a Winsor Type III microemulsion with water positioned in the formation, thereby producing a very low interfacial tension (IFT) microemulsion system. The low IFT with the excess water phase allows the trapped water to be mobilized and displaced out of the formation.

The mixture is injected into a subterranean formation by simply injecting it into a well or wellbore in the zone of interest of the formation and thereafter pressurizing it into the formation for the selected distance. Methods for achieving the placement of a selected quantity of a mixture in a subterranean formation are well known, as will be discussed hereinafter.

After treatment of the formation for a selected period of time, which is typically from about 8 to about 96 hours, and preferably from about 16 to about 24 hours, the mixture is removed from the near-wellbore portion of the subterranean formation. This removal may conveniently be accomplished by simply producing the well. The hydrocarbonaceous liquid mixture is recovered from the near-wellbore portion of the formation and produced along with crude oil.

It has been found that the use of this composition has been effective to remove water from the near-wellbore portions of subterranean formations down to, and in some instances below, the connate water saturation level of the formation. As a result increased oil production has been achieved.

Figure 3:
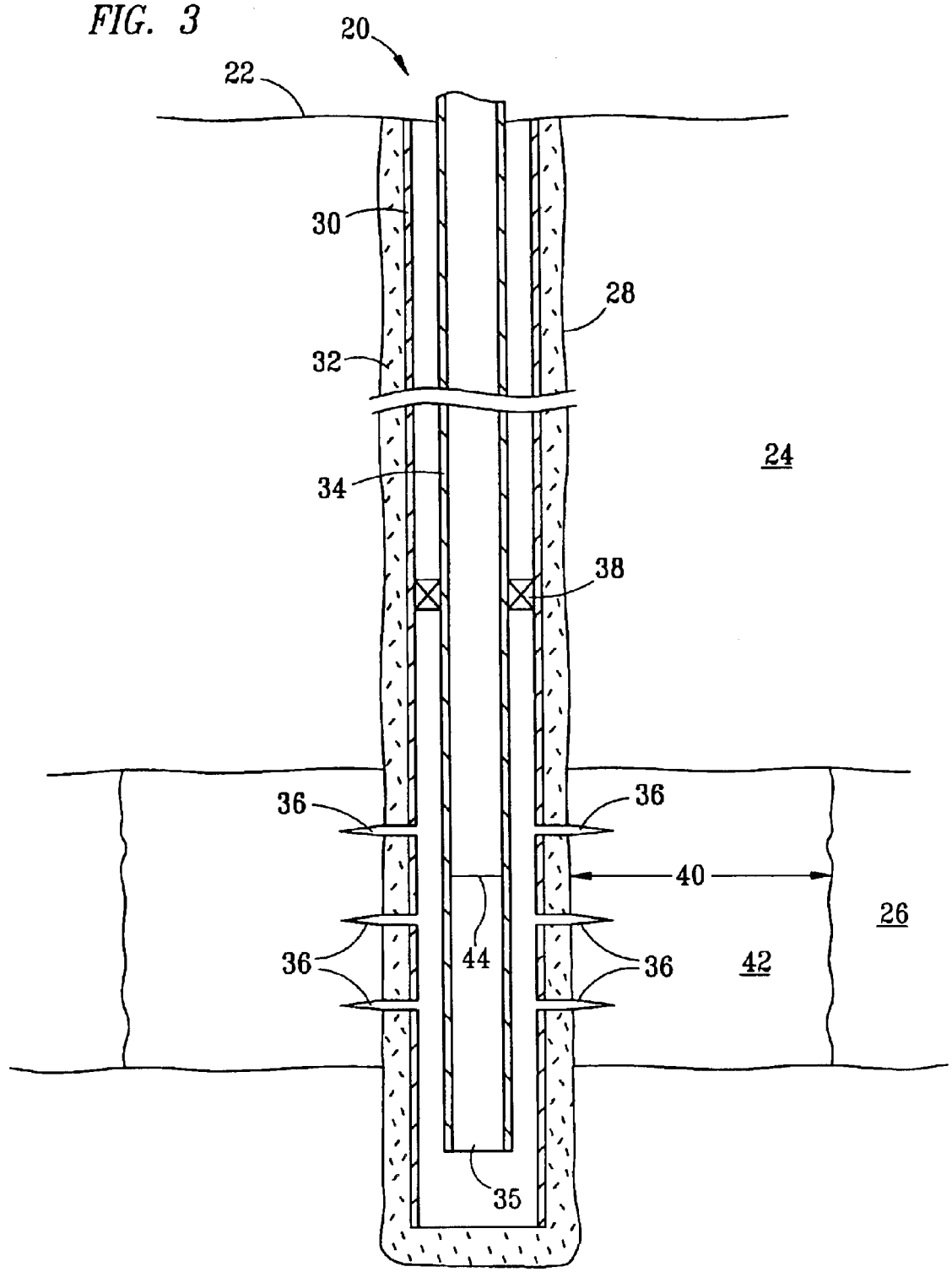

By reference to FIG. 3, a well 20 is shown. Well 20 comprises a wellbore 28 positioned from a surface 22 through a subterranean formation 24 which may comprise a plurality of naturally-occurring overburden formations which overlie an oil-bearing naturally-occurring formation 26. It will be understood that other formations underlie formation 26. A well casing 30 is positioned in wellbore 28 and cemented in place with cement 32. A tubing 34 extends downwardly through casing 30 to near the bottom of well 20. Perforations 36 are positioned through casing 30, cement 32 and into subterranean 26. A packer 38 is positioned above formation 26 in casing 30 so that when the mixture is injected downwardly through tubing 34 it passes downwardly through tubing 34 out through a lower end 35 of tubing 34 and then with continued pumping of liquid through tubing 34 the mixture is pushed through perforations 36 into formation 26. A second liquid, which can be a simple carrier hydrocarbon liquid, can be used to push the mixture downwardly through and out of tubing 34 by injecting the second liquid as a pusher fluid to a level 44 in tubing 34. It will be understood that well 20 could include a horizontal portion.

Typically, the composition of the present invention will be injected by pumping it down tubing 34 in a volume sufficient to fill a near-wellbore portion 42 of formation 26 with the composition out to a distance 40, which defines the near-wellbore portion of formation 26. Distance 40, as indicated, may be out to about 3 feet. While a larger slug could be injected if desired, it is believed that a slug sufficient to fill the near-wellbore portion out to 3 feet will generally be found to be effective. The distance may be more if desired.

After the composition has been allowed to remain in place for a selected time, as discussed above, the composition is recovered from formation 26 by simply pumping fluids from well 20 up tubing 34, as is commonly done to produce fluids from formation 26. Well 20 may include a pump (not shown) without departing from the spirit of the present invention.

The invention further comprises a formulation for addition to a hydrocarbonaceous liquid to produce a mixture for removing bound water from a near-wellbore portion of a subterranean formation containing a crude oil and penetrated by a wellbore, the formulation comprising: about 18 to about 34 volume percent of an ethoxylated alcohol, consisting of alcohols containing from about 8 to about 12 carbon chain length alkyl groups with an average of about 2 to about 4 ethylene oxide groups per molecule of alcohol; about 8 to about 28 volume percent of at least one alkylpolyglycoside containing alkyl groups containing from about 8 to about 16 carbon atoms and having an average oligomerization number about 1.2 to about 1.8; and, from about 50 to about 70 volume percent of a linear alkyl alcohol containing from about 4 to about 6 carbon atoms.

As indicated previously, the components are mixed with the hydrocarbonaceous liquid to produce the composition for injection.

The present invention further comprises a mixture of the formulation with a hydrocarbonaceous liquid to produce a quantity of a hydrocarbonaceous mixture for use for the removal of bound water from a near-wellbore portion of a subterranean formation penetrated by a wellbore, the mixture consisting essentially of: about 0.5 to about 2 volume percent of an ethoxylated alcohol, consisting of alcohols containing about 8 to about 12 carbon chain length alkyl groups with an average of about 2 to about 4 ethylene oxide groups per molecule of alcohol; about 0.2 to about 2 volume percent of at least one alkylpolyglycoside containing alkyl groups containing from about 8 to about 16 carbon atoms and having an average oligomerization number about 1.2 to about 1.8; and, from about 1.5 to about 4 volume percent of a linear alkyl alcohol containing from about 4 to about 6 carbon atoms, with the balance of the mixture comprising the hydrocarbonaceous liquid.

Desirably, the HLB number (hydrophile-lipophile balance) is from about 6 to about 10 for the ethoxylated alcohol. Desirably, the composition of the mixture is adjusted within the limits set forth above to produce a hydrocarbonaceous mixture that is capable of forming microemulsions and particularly Winsor Type II or Winsor Type III microemulsions upon contact with the water contained in the near-wellbore portion of the subterranean formation. Once this water is solubilized into a microemulsion, or as an excess water phase of ultra low interfacial tension in contact with the microemulsion phase, it is readily produced from the formation thereby leaving the formation free of blocking water. This is an ideal solution to the problem and permits increased production of crude oil from the formation.

The present invention is further illustrated by laboratory testings illustrated in Example 1 and Example 2. An Arctic diesel oil containing 1.05 volume percent of ethoxylated alcohol containing alcohols of $C_9$–$C_{11}$ carbon chain length alcohols and an average 2.5 ethylene oxide groups per molecule of alcohol; 0.42 volume percent of alkylpolyglycoside having an oligomerization number of 1.45 and containing alkyl groups containing from 8 to 16 carbon atoms; and, 2 volume percent of a $C_4$ and $C_6$ (3:1 volume ratio of $C_4$ with $C_6$ alcohol) linear alcohol mixture, was mixed with 6 weight percent KCl brine at 80:20 and 60:40 volume ratios. After the mixture is equilibrated, the interfacial tension between the microemulsion phase and the excess brine phase is measured at 68° F. and at 160° F. temperatures.

EXAMPLE 1

TABLE I

Interfacial Tension Measurement

| Arctic Diesel Surfactant Fluid Composition | 6% KCl Brine | Equilibration Temperature | IFT, dyne/cm |
|---|---|---|---|
| 80% | 20% | 68° F. | 0.0018370 |
| 80% | 20% | 160° F. | 0.0002680 |
| 60% | 40% | 68° F. | 0.0196800 |
| 60% | 40% | 160° F. | 0.0008835 |

Quantities of the Arctic diesel surfactant fluid composition as described above were mixed with KCl brine in the quantities shown. The quantities of brine in the test were chosen to reflect the range of water saturation present in the near wellbore formation. The KCl brine is used because the drill-in fluid composition, hence the drill-in-fluid filtrate, contains a brine salinity of 6 percent by weight KCl brine. The interfacial tension between the microemulsion phase and excess brine phase in the mixture is then measured by the spinning drop apparatus at the temperatures shown. It will be observed that these interfacial tensions are very low. By comparison, the interfacial tension between oil and water at room temperature is typically considered to be about 40 to 50 dynes per centimeter. It is clear that the interfacial tension between the excess brine phase and the microemulsion phase is much less. This demonstrates that this diesel oil surfactant fluid composition is clearly capable of forming microemulsions with an ultra low interfacial tension, which allows the mobilization of the trapped water phase out of the near wellbore formation.

EXAMPLE 2

In this Example, core plugs of a formation known to imbibe water were tested. These cores were virgin cores from a formation and were 1 inch in outer diameter by 1 to 2 inches long. In these tests, the core plugs were first treated by passing oil and then water through the cores. Thereafter the composition of the present invention was injected into the cores. The test program consisted of:

1. Drill plugs (1" OD) from preserved core material using liquid nitrogen.

2. Mount test samples (plugs), apply full reservoir pressure and overburden pressure and heat to reservoir temperature.

3. Press aqueous filtrate from samples of a water-based drilling mud, specifically FLO-PRO drilling field mud (Trademark of M-I, LLC).

4. Measure baseline permeabilities to oil on the samples at 5, 20, 50, and 100 psi drawdown pressure levels.

5. At 100 psi overbalance level flush plug with the aqueous filtrate until approximately 2 pore volumes of production of filtrate is recovered.

6. Measure the regained permeabilities to determine the 'damaged' water blocked perm at 5, 20 and 50 psi drawdown levels.

7. Inject the treatment fluid containing the surfactant (diesel oil based) for approximately 8 pore volumes at a 100 psi applied overbalance pressure.

8. Allow minimum of 8 hours of "soak time."

9. Re-measure the return permeabilities to oil at 5, 20, 50, 100, 200 and 20 psi drawdown to note effect of surfactant treatment on core permeability.

The test results are shown in Table 2.

TABLE II

The Core Testing Results

| Core Number | 100 psi dp Initial Perm. md. | 100 psi dp Damaged Perm. md. | Damaged Perm % Initial | Final Restored Perm | Final Restored Perm % Initial |
|---|---|---|---|---|---|
| 1-3A | 12.70 | 1.83 | 14.4% | 3.08 | 24.3% |
| 3-2B | 22.87 | 9.65 | 42.2% | 28.06 | 122.7% |
| 2-3A | 1.65 | 0.113 | 6.9% | 0.38 | 23.0% |
| 3-3A | 28.65 | 11.25 | 39.3% | 32.71 | 114.2% |
| 1-2B | 8.44 | 1.25 | 14.8% | 6.09 | 72.2% |
| 2-2B | 1.89 | 0.122 | 6.5% | 0.939 | 49.7% |

The core numbers are shown and the first column of numbers shows the initial permeability of the cores to oil at 100 psi of drawdown pressure. The second column shows the average oil permeability for each core after passage of brine filtrate through the core. It will be noted in all instances that permeability has been greatly reduced. Permeability of the damaged core as a percentage of the original permeability is shown in the fourth column. The final restored permeability, after treatment with an injection of the treatment fluid through the cores, is shown in the fifth column. The final restored percent of the initial permeability is shown in the final column. It will be observed that in all instances, a substantial improvement in the permeability of the core after water contact has been achieved by the use of the composition of the present invention.

In use, the composition of the present invention when placed in the near-wellbore portion of the subterranean formation will contact trapped water and generate a microemulsion by reducing the high interfacial tension between the water droplets in the pore throats/walls, thus allowing the water molecules to be more readily passed through the formation pore structure. Once the well is returned to production, water exiting the formation as the microemulsion is removed from the wellbore. The removal of imbibed or other water and restoration of the formation's natural wettability increases the relative permeability to oil resulting in improved oil recovery and production rates.

EXAMPLE 3

An actual well having 2,300 feet of 6-⅛" horizontal open-hole section in a producing formation in the North Slope of Alaska was treated with the composition of the present invention. The Arctic diesel oil was present in an amount of 96.5 volume percent, the alkylpolyglycoside was present in an amount of 0.42 volume percent with the ethoxylated alcohol and the linear alkyl alcohol being present in amounts of 1.05 volume percent and 2 volume percent respectively.

Test III. Field Test

| Date | Oil bbl/day | Gas/Oil Ratio (GOR) | Flowing Tubing Pressure (FTP) (psi) | Temperature ° F. |
|---|---|---|---|---|
| Pre-treatment | | | | |
| | 936 | 943 | 188 | 52 |
| Post-treatment | | | | |
| Day 1 | 1001 | 921 | 798 | 57 |
| Day 2 | 2628 | 612 | 216 | 77 |
| Day 3 | 1843 | 1056 | 198 | 71 |
| Day 4 | 1684 | 882 | 195 | 71 |
| Day 5 | 1320 | 659 | 189 | 66 |
| Day 6 | 1733 | 936 | 195 | 67 |
| Day 7 | 1743 | 892 | 195 | 67 |

It is immediately apparent that the oil production from the treated well has been increased from 936 barrels per day (bbl/day) prior to treatment to about 1743 bbl/day after the treatment. This is a significant improvement, almost a doubling of the production from the well. Clearly, the treatment of the present invention has been effective to improve the production of oil from the treated well.

According to the present invention, a composition is provided which is effective to remove bound water from the near-wellbore area of a subterranean formation. A method is also provided for removing bound or "acquired" water from the near-wellbore area portion of a subterranean formation and a formulation is provided which can be mixed with a hydrocarbonaceous liquid at the well site or otherwise to provide the desired composition. The formulation may be provided separately as three components or the components may be combined. In any event, the components are available for transportation as relatively small volume components of the composition of the present invention. These components are readily mixed with the hydrocarbonaceous liquid selected for use to treat the formation.

According to the present invention, subterranean formations may be treated to remove bound water from the near-wellbore portion of a subterranean formation to restore permeability to oil in the near-wellbore portion of the formation. This is effective to increase the production of oil from the subterranean formation.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for removing bound water from a wellbore portion of a subterranean formation containing crude oil penetrated by a wellbore, the method comprising:
   a) injecting into the near-wellbore portion a quantity of a mixture containing a hydrocarbonaceous liquid, the hydrocarbonaceous liquid being miscible with the crude oil in the formation, about 0.5 to about 2 volume percent of an ethoxylated alcohol, containing from about 8 to about 12 carbon chain length alkyl groups with an average of about 2 to about 4 ethylene oxide groups per molecule of alcohol; about 0.2 to about 2 volume percent of at least one alkylpolyglycoside containing alkyl groups containing from about 8 to about 16 carbon atoms and having an average oligomerization number from about 1.2 to about 1.8; and; about 1.5 to about 4 volume percent of a linear alkyl alcohol containing from about 4 to about 6 carbon atoms, the quantity being a quantity sufficient to fill the near-wellbore portion of the formation to a radial distance of up to about 3 feet outwardly from the well bore;
   b) maintaining the mixture in the near-wellbore portion for a time from about 6 to about 96 hours; and,
   c) removing the mixture from the near-wellbore portion.

2. The method of claim 1 wherein the hydrocarbonaceous liquid comprises a solvent for the crude oil.

3. The method of claim 1 wherein the hydrocarbonaceous liquid is selected from the group consisting of crude oil, xylene, diesel oil, aliphatic solvents, aromatic solvents and mixtures thereof.

4. The method of claim 1 wherein the at least one alkylpolyglycoside has an average oligomerization number from about 1.4 to about 1.6.

5. The method of claim 1 wherein the linear alkyl alcohol is present in an amount of from about 1.5 to about 3 volume percent in the mixture.

6. The method of claim 1 wherein the radial distance is from about 6 inches to about 3 feet.

7. The method of claim 6 wherein the radial distance is from about 1 to about 3 feet.

8. The method of claim 1 wherein the time is from about 8 to about 24 hours.

9. The method of claim 1 wherein the mixture is removed from the near-wellbore portion by producing fluids from the wellbore.

10. An oil-based composition for removing bound water from a near-wellbore portion of a subterranean formation containing a crude oil and penetrated by a wellbore, the composition comprising: a hydrocarbonaceous liquid, the hydrocarbonaceous liquid being miscible with the crude oil in the formation; about 0.5 to about 2 volume percent of an ethoxylated alcohol, containing from about 8 to about 12 carbon chain length alkyls with an average of about 2 to about 4 ethylene oxide groups per molecule of alcohol; about 0.2 to about 2 volume percent of at least one alkylpolyglycoside containing alkyl groups containing from about 8 to about 12 carbon atoms and having an average oligomerization number from about 1.2 to about 1.8; and, about 1.5 to about 4 volume percent of a linear alkyl alcohol containing from about 4 to about 6 carbon atoms.

11. The composition of claim 10 wherein the hydrocarbonaceous liquid comprises a solvent miscible with the crude oil.

12. The composition of claim 10 wherein the hydrocarbonaceous liquid is crude oil, xylene, diesel oil, aliphatic solvents, aromatic solvents and mixtures thereof.

13. The composition of claim 10 wherein the at least one alkylpolyglycoside has an average oligomerization number from about 1.4 to about 1.6.

14. The composition of claim 12 wherein the linear alkyl alcohol is present in an amount of from about 1.5 to about 3 volume percent in the mixture.

15. A composition for removing bound water from a near-wellbore portion of a subterranean formation containing a crude oil and penetrated by a wellbore, the composition consisting essentially of: a hydrocarbonaceous liquid, the hydrocarbonaceous liquid being miscible with the crude oil in the formation; about 0.5 to about 2 volume percent of an ethoxylated alcohol, containing alkyl groups containing from about 8 to about 12 carbon chain length alkyl groups with an average of about 2 to about 4 ethylene oxide groups per molecule of alcohol; about 0.2 to about 2 volume percent of at least one alkylpolyglycoside containing alkyl groups containing from about 8 to about 16 carbon atoms and having an average oligomerization number from about 1.2 to about 1.8; and, about 1.5 to about 4 volume percent of a linear alkyl alcohol containing from about 4 to about 6 carbon atoms.

16. A formulation for admixture with a hydrocarbonaceous liquid to produce a quantity of hydrocarbonaceous mixture for use for the removal of bound water from a near-wellbore portion of a subterranean formation penetrated by a wellbore, the formulation consisting essentially of: about 18 to about 34 volume percent of an ethoxylated alcohol, containing from about 8 to about 12 carbon chain length alkyl groups with an average of about 2 to about 4 ethylene oxide groups per molecule of alcohol; about 8 to about 28 volume percent of at least one alkylpolyglycoside containing alkyl groups containing from about 8 to about 16 carbon atoms and having an average oligomerization number from about 1.2 to about 1.8; and, about 50 to about 70 volume percent of a linear alkyl alcohol containing from about 4 to about 6 carbon atoms.

\* \* \* \* \*